Feb. 11, 1947. S. E. JESSUP 2,415,594
PISTON
Filed June 12, 1944    2 Sheets-Sheet 2
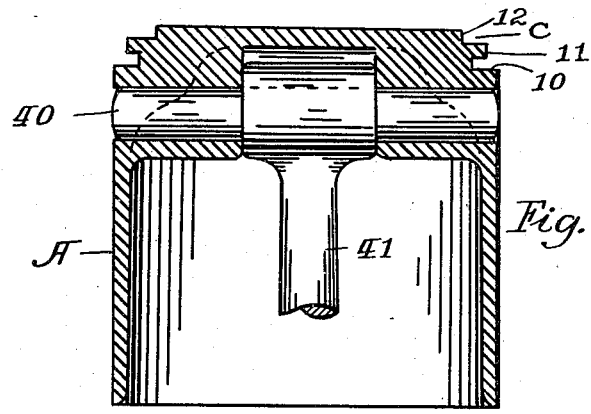
Fig. 5.
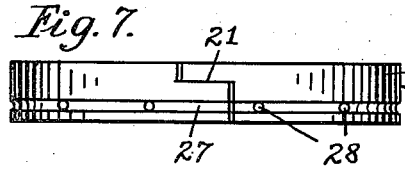
Fig. 7.
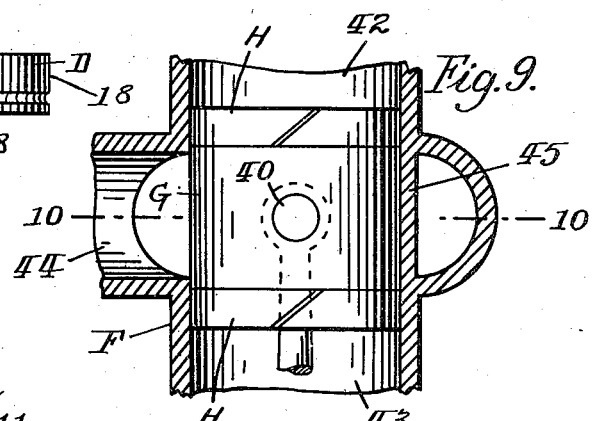
Fig. 9.
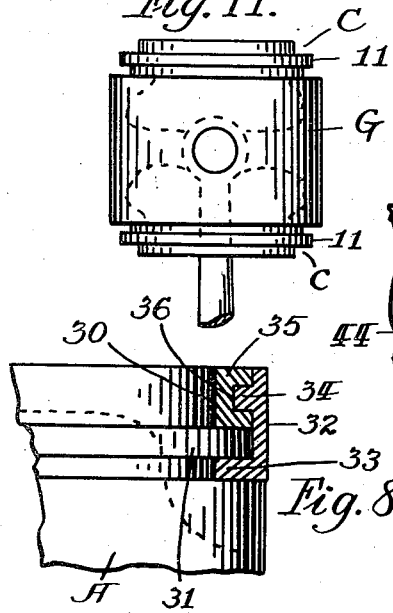
Fig. 11.
Fig. 8.
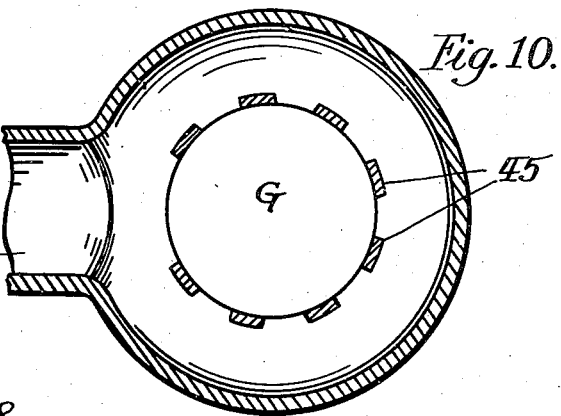
Fig. 10.
Inventor:
Sellers E. Jessup,
by: F. G. Bradbury
Attorney.

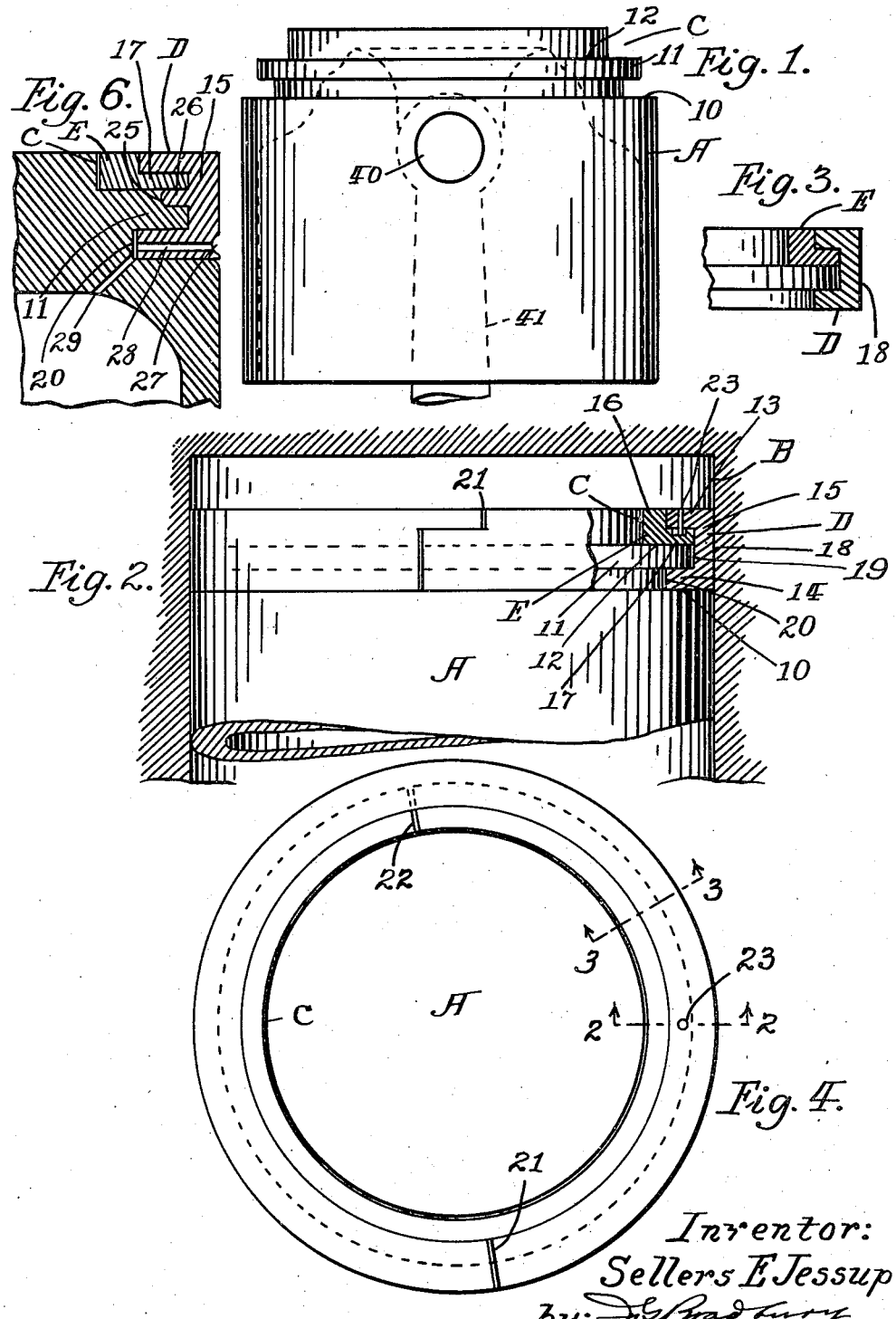

Patented Feb. 11, 1947

2,415,594

UNITED STATES PATENT OFFICE 2,415,594

PISTON

Sellers E. Jessup, Los Angeles, Calif.

Application June 12, 1944, Serial No. 539,879

4 Claims. (Cl. 309—44)

My invention relates to improvements in pistons for use in internal combustion, steam and other types of engines, compressors, pumps, valves and other devices which employ a piston and cylinder or their equivalent. More particularly my improved piston is adapted for reciprocation in a cylinder and in which an end piston ring unit is employed, said piston ring unit being of the type disclosed in my application for patent filed January 16, 1943, bearing Serial Number 472,583. One of the objects therefore of the present application is to assist in producing a tight seal between the piston and the wall of the cylinder within which the former reciprocates so that loss of fluid compression is reduced to a minimum irrespective of what type of fluid is employed. Another object is to provide a piston which is particularly adapted for more effective use in a cylinder or with the novel type of piston ring unit disclosed in my companion application referred to above. As a result my improved piston when used with my improved piston ring unit referred to above produces a more effective leak proof bearing between the piston and cylinder, efficiency in operation is increased, leakage of compressed fluid and lubricating oil is reduced, and the wrist pin may be applied more closely to the head of the piston which is a distinct advantage. As a further result packing of carbon back of and between the surfaces of the piston and the companion piston ring unit is prevented or reduced sufficiently so that high efficiency is maintained.

These and other objects and advantages will be apparent from the following description and the accompanying drawings forming part thereof, in which, Fig. 1 is a side elevation, partly in section of a reciprocable piston constructed in accordance with my improvement, said piston as shown being of that type which is adapted for use in an internal combustion engine or with the reciprocable members of any other type of piston and cylinder couple; Fig. 2 is a longitudinal central section of a portion of a cylinder wall showing a portion of my improved piston therein which is provided with my improved end type piston ring unit, a portion of the latter being shown in section taken on the line 2—2 of Fig. 4; Fig. 3 is a section of the piston ring unit taken on the line 3—3 of Fig. 4; Fig. 4 is an end view of my improved piston showing it equipped with my improved piston ring unit; Fig. 5 is a central longitudinal section of my improved piston; Fig. 6 is a section of a detail illustrating an alternative construction of my improved piston when equipped with an alternative type of piston ring unit; Fig. 7 is a side elevation of the piston ring unit shown in Fig. 6; Fig. 8 is a section of a detail illustrating an alternative construction of my improved piston when equipped with another alternative type of piston ring unit; Fig. 9 is a longitudinal central section of a portion of a three way valve showing an adaptation of my improved piston and piston ring unit applied thereto; Fig. 10 is a section taken on the line 10—10 of Fig. 9, and Fig. 11 is a side elevation of my improved piston when modified and applied to the valve illustrated in Figs. 9 and 10.

My improved piston is particularly adapted for use with an end piston ring unit in which a tight seal is produced between the piston and the wall of a cylinder by the force of compressed fluid against the end of the piston and an end piston ring unit as distinguished from the usual type of piston ring which is applied in the side of the piston relatively remote from its ends, in which latter case the expansive force of the piston ring is relied upon for producing a fluid tight joint or connection. A type of my improved piston A is of cylindrical form and is adapted to reciprocate in a cylinder B, a portion of which latter is shown in Fig. 2. As shown in Figs. 1 to 5 inclusive, my improved piston has a cylinder body or shell in the head of which is an annular peripheral groove C which enters its forward end and side. The rearward end 10 of this groove lies in a plane at right angles to the axis of the piston and the longitudinal side surface of the groove is provided with a laterally directed feather 11, which radiates outwardly therefrom and functions as a sealing seat 12 and as a lock or retaining key for the piston ring unit to be hereinafter described.

The piston ring unit for use with my improved type of piston as illustrated in my companion application above identified is composed of two interlocking split expansible concentric rings D and E. The outer ring D has an inner concentric channel formed by forward and rearward inwardly directed annular shoulders 13 and 14, and by an outer longitudinal web 15 therebetween. The inner packing ring has an inner annular body 16 which is formed with a radiating annular lip or portion 17. This lip slidably engages below and forms a tight sealing seat for the forward annular shoulder 13. In this position said body including its seat is engaged by and also forms a movable tight sealing seat upon the forward side of the feather 11 while the forward lateral faces of the body of the inner ring and of the outer ring lie substantially in the plane of the forward end of the head of the piston. The forward faces are thus exposed to the full force of fluid compression in the cylinder ahead of the piston to produce a sealed connection between the piston ring unit and piston. The outer side wall 18 of the outer ring is urged outwardly in tight sliding connection with the inner wall of the cylinder, partly by the resilient expansive force of the ring and by the force of fluid compression which is exerted against the forward end of the piston and the piston ring unit. Sufficient play may be provided laterally to permit the application of the compressed fluid against the inner sides of the piston rings, but normally the rings are fitted only to machine clearance leaving very slight spaces in which the expansive force of fluid compression may function laterally.

The rearward annular shoulder 14 of the outer ring is slidably engaged below the annular feather 11 to retain the packing ring unit on the piston while lateral clearance spaces such as 19 and 20 permit the free expansive action of said rings.

The rings are split by overlapping joints 21 and 22 in staggered relation to each other to prevent leaking as shown in Figs. 2, 4 and 7, and are held relatively but freely in operative position by a dowel pin 23, as shown in Figs. 2 and 4. As shown the overlapping joint is of rectangular type but may be of bevel or any other type desired as shown in Fig. 9.

When desired the feather 11 may be formed with an annular socket 25 and the web 15 of the outer packing ring D may be provided with a corresponding inwardly projecting annular tongue 26 which engages in said socket to increase the sealing effect between the ring unit and the feather on the piston as shown in Fig. 6. Also when desired the piston may be provided with vent means for surplus lubricating medium, an annular channel 27 being formed in the outer ring having ducts 28 leading inwardly therefrom and vent passages such as 29 entering the piston from below the lower seat and the clearance space 20 for that purpose as shown in Figs. 6 and 7. It will be understoood that in this instance the piston is in the form of a shell, having the usual closed head and skirt.

A further modification is also shown in Fig. 8 in which the piston A has the peripheral annular groove 30 in its head, entering its forward end and side, said groove being provided with the annular feather 31, projecting laterally from its inner side wall. The piston ring unit in this instance has an outer expansible split ring 32 formed with an inwardly projecting lower annular shoulder 33 which normally is engaged below the feather to retain the ring unit in place in said groove. The outer ring has an inwardly projecting annular shoulder 34 spaced below its forward edge and above said feather. The piston ring unit also has an inner expansible split ring 35 formed with an inwardly projecting channel 36 in its outer side wall in which the shoulder 34 engages while the inner ring is nested in said annular groove 30 to retain the inner ring in place while the forward faces of the two rings assume a position in the plane of the forward face of the piston head. In this manner the feather functions as retaining means for holding the pair of rings assembled on the end of the piston.

By applying a single end piston ring unit in the peripheral annular groove in the end of the piston as provided by my improvement, the wrist pin 40 by which the crank arm 41 is connected to the piston as shown in Figs. 1 and 5 can be applied at a point closer to the piston head and to the center of the application of the load as shown. The weight of the piston can thus be materially reduced. Also friction between the cylinder wall and the side of the piston is reduced due to the lateral thrust exerted by the crank arm being more evenly distributed. As a result tighter compression is maintained and the life of a reciprocable unit prolonged, which are distinct advantages.

My improved piston is further adapted by modification to be applied for various uses within the spirit of the invention, Figs. 9 to 11 inclusive illustrating one such adaptation in which it is shown applied for use in a three way valve housing F, having two opposed coaxial inlet ducts 42, an 43 and a single laterally extending outlet duct 44. My improved piston G in this instance is of closed cylindrical type and is adapted to reciprocate through the ducts 42 and 43 to alternately open only one or close both. Both ends of the piston G are equipped in the same manner as illustrated in Figs. 1 to 4 inclusive with my improved piston ring unit, an annular groove C with an annular radiating feather 11 therein being provided to permit the application of a piston ring unit, whereby the force of compressed fluid against either end of the piston functions to produce a seal proof joint in any one of the operating positions assumed by the piston.

It should be noted that the spaced longitudinal guides 45 as shown in Figs. 9 and 10, serve to hold the packing ring units H in the grooves C while the valve reciprocates into any of its operating positions.

My improved piston in cooperation with my improved piston ring unit, accomplishes the improved results and advantages set forth above and in my companion application above identified.

In accordance with the patent statutes, I have described the principles of operation of my invention together with the construction thereof which I now consider to represent the best embodiment thereof, but I desire to have it understood that the construction shown is only illustrative and that the invention can be carried out by other means and applied to uses other than those above set forth within the spirit thereof and within the scope of the following claims.

I claim:

1. A piston for cooperation with an end piston ring unit in a cylinder, said piston ring unit comprising an expansible outer ring having an inner annular channel formed by a pair of forward and rearward inwardly directed annular shoulders and an inner expansible ring nested within the outer ring having a radiating annular seat engaging below and supporting said forward shoulder, said piston being hollow and having a piston head, said piston having a peripheral groove entering its forward end to receive and expose the piston ring unit longitudinally with the forward faces of the outer and inner rings exposed to the full force of compression of fluid in the cylinder against the forward end of the piston, an annular feather radiating from the side surface of said groove providing a supporting seat for said inner ring and engaging over the rearward inwardly directed shoulder on said outer ring to retain the ring unit in said groove, and vent passage means for lubricating medium entering the piston from between the rearward shoulder on the outer piston ring and the rearward portion of the groove in the piston.

2. A piston for cooperation with an end piston ring unit in a cylinder, said piston ring unit comprising an expansible outer ring having an inner annular channel formed by a pair of forward and rearward inwardly directed annular shoulders and an inner expansible ring nested within the outer ring having a radiating annular seat engaging below and supporting said outer ring below said forward shoulder, the head end of said piston having an annular groove in the peripheral annular edge of its forward end to receive the piston ring unit with the forward faces of the outer and inner rings exposed longitudinally to the full force of compression of fluid in the cylinder ahead of the piston, an annular feather radiating from the side of said groove providing a forward supporting seat for said inner ring and engaging outwardly over the rearward shoulder of the outer ring to retain the ring unit on the piston and providing lateral clearance space between the rearward shoulder of the outer ring and the side of the groove, said feather having an annular socket below the inner ring, and the outer ring having a corresponding annular tongue engaging inwardly below the radiating annular seat on said inner ring in said socket to assist in producing a leakproof joint between the piston and the members of the piston ring unit.

3. A piston ring structure for use on a piston having a peripheral annular groove entering its forward end and an annular feather radiating from the side surface of said groove having an annular socket in its forward face, said piston ring structure comprising an expansible outer ring having an inner annular channel formed by a pair of forward and rearward inwardly directed annular shoulders and an inner intermediate annular shoulder to engage said feather in said socket while the rearward shoulder engages below said feather to retain the outer ring on the piston, and an inner expansible ring nested within the forward portion of the outer ring having a radiating annular seat engaging below the forward shoulder of the outer ring and over said intermediate annular shoulder in the outer ring to form an expansible intermeshing joint between said rings, said outer and inner rings being exposed to the full force of compression on the forward end of the piston.

4. In a structure as defined in claim 3, the rearward shoulder on the outer ring having a lubricating passage between the peripheral surface of the outer ring and its inner surface below said rearward shoulder.

SELLERS E. JESSUP.

REFERENCES CITED

The following references are of record in the file of this patent:

UNITED STATES PATENTS

| Number | Name | Date |
|---|---|---|
| 2,367,030 | Jessup | Jan. 9, 1945 |
| 1,584,520 | Duncan | May 11, 1926 |
| 1,711,610 | Mead | May 7, 1929 |
| 1,418,931 | Johnston | June 6, 1922 |
| 1,396,620 | Bramberry | Nov. 8, 1921 |

FOREIGN PATENTS

| Number | Country | Date |
|---|---|---|
| 140,552 | British | Feb. 6, 1919 |